Figure 1:
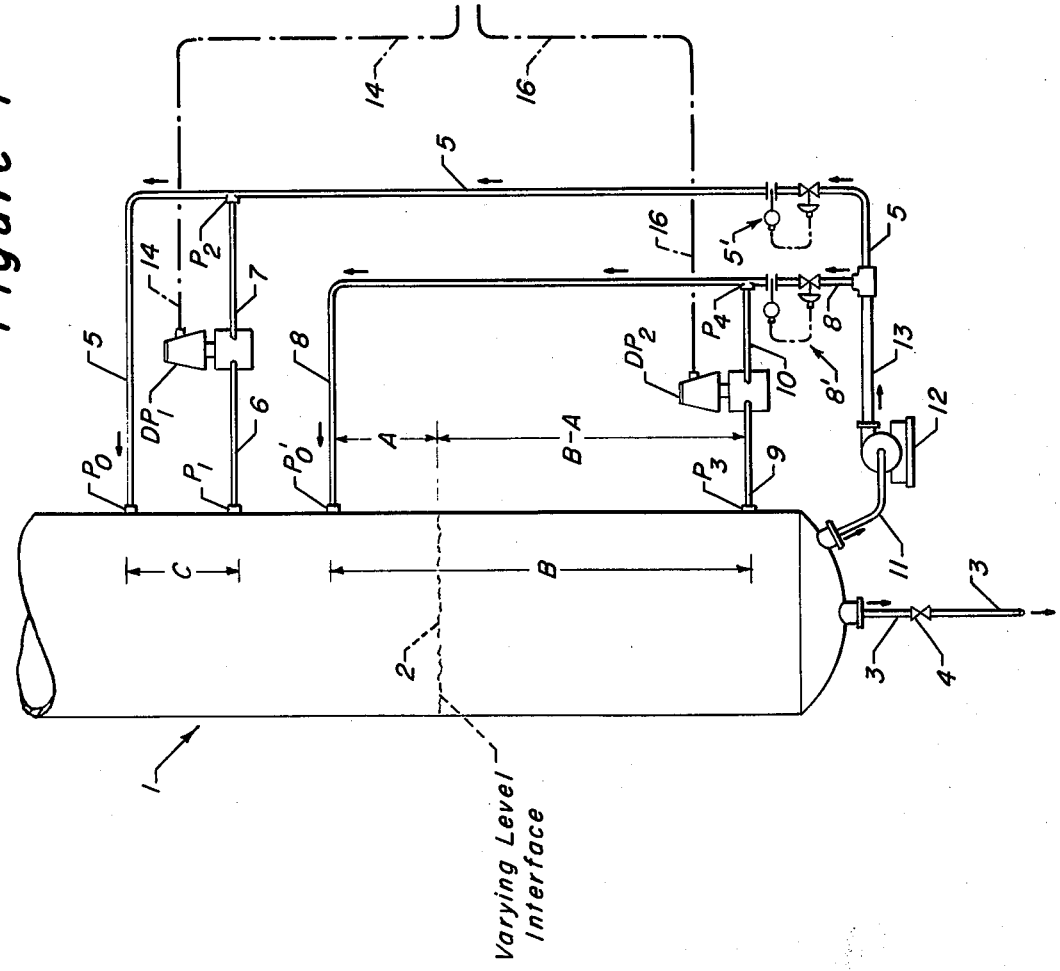

United States Patent [19]
Thompson

[11] 3,886,795
[45] June 3, 1975

[54] LIQUID INTERFACE LEVEL DETERMINING SYSTEM
[75] Inventor: Herbert Lytle Thompson, Park Ridge, Ill.
[73] Assignee: Universal Oil Products Company, Des Plaines, Ill.
[22] Filed: Nov. 19, 1973
[21] Appl. No.: 417,344

[52] U.S. Cl. ............................................. 73/299
[51] Int. Cl. ...................................... G01f 23/14
[58] Field of Search ...................... 73/299, 301, 302

[56] References Cited
UNITED STATES PATENTS
| | | | |
|---|---|---|---|
| 2,521,477 | 9/1950 | Pellettere | 73/299 |
| 3,250,123 | 5/1966 | Clayton | 73/301 |
| 3,373,609 | 3/1968 | Sundby | 73/299 |

Primary Examiner—Richard C. Queisser
Assistant Examiner—Joseph W. Roskos
Attorney, Agent, or Firm—James R. Hoatson, Jr.; Philip T. Liggett; William H. Page, II

[57] ABSTRACT

In connection with solvent extraction columns having an interface between substantially immiscible liquids, there is provided a novel system which divides output signals from two different differential pressure reading devices that in turn receive pressure readings from suitably spaced levels along the height of the column such that the resulting ratio, obtained from the dividing of the signals, when applied to a distance between the two uppermost pressure sensing levels will be determinative in locating the position for the liquid-liquid interface. The system provides for automatically eliminating the problem of changes in density for either, or both, the solvent phase and the solute phase.

7 Claims, 2 Drawing Figures

LIQUID INTERFACE LEVEL DETERMINING SYSTEM

The present invention relates to an improved system for determining the liquid-liquid interface in a column or chamber adapted to receive substantially immiscible liquid mediums. In particular, the improved system provides for automatically determining an interface level from the results of differential pressure readouts that, in turn, are provided from spaced pressure sensing points and from the effect of a pumped dense phase recirculation pressure which assists in compensating for changes in density for either, or both, phases being collected in the particular chamber.

It is realized that there are many types of devices and systems which have been used to locate a liquid-liquid interface in a chamber or tower in connection with a chemical or petroleum processing unit. Such systems may incorporate electrical signals and be quite sophisticated in design and operation. In some cases, gamma-ray emitting and detecting devices have been used to determine a liquid level or a liquid interface. However, these systems generally require elaborate apparatus for the movement of the ray emitting device. In any event, many systems do not necessarily provide for compensation against changes in density for either of the two liquid phases. For example, in a solvent extraction operation, where aromatic hydrocarbons are being dissolved and removed from a hydrocarbon feed stream by the use of glycol, or by the use of a sulfolane or sulfolene solvent phase, there can be mixtures of hydrocarbon and solvent each side of the interface between the two liquid phases in any given liquid receiving chamber. In other words, there may be, and generally is, some mixing of the substantially immiscible liquids and not always a clearly defined interface between distinct and "pure" phases. In many processing operations there is also some change in the amount of extractable component(s) in the feed mixture such that there are resulting periodic changes in the density of either, or both, phases in the zone of the interface within the receiving column.

In this instance, it is the principal object of the invention to provide an apparatus system which can automatically give a readout that is determinative of the position of a liquid-liquid interface in a liquid receiving column.

It is a further object of the invention to provide a level determining system which has a "built-in" compensation for changes in density that can occur with respect to either, or both, phases of liquid in the liquid-liquid separation tower.

Actually, various types of vessels may be provided with an interface level readout system in accordance with the present invention, with such system being applied to storage tanks, liquid-liquid separators or extraction columns, absorption and stripping columns, as well as separator towers for liquid catalyst-hydrocarbon feed streams, etc.

In one embodiment, the apparatus system of this invention for locating an interface between liquids of different density that are collected within a confined chamber comprises in combination, (a) two spaced apart levels of pressure sensing from an upper portion of said chamber to provide contact with the lower density liquid at two spaced levels therein; (b) means connecting each of said levels for pressure sensing to a first differential pressure transmitting device; (c) a third level of pressure sensing to said chamber at a position below first said differential pressure device in said chamber to also be in contact with said lower density liquid; (d) a fourth level of pressure sensing connective to a lower level in said chamber for contact with the higher density liquid being collected therein; (e) means connecting said third and fourth levels for pressure sensing to a second differential pressure transmitting device; (f) liquid outlet means from a lower portion of said chamber connective to means to fill the conduit means which is connective to the chamber at the uppermost and said third levels of pressure sensing, and to the higher pressure level side for each of said differential pressure transmitting devices to thereby add hydrostatic pressure from the higher density liquid to each such side; (g) signal divider means connective to said two devices to divide the differential pressure signals from said devices; and (h) a signal divider readout means to provide a ratio output reading which can be calibrated to indicate an interface position below said third level of pressure sensing.

Various types or forms of pressure sensing means and pressure differential readout means may be provided within the present interface level indicating system. In other words, pressure sensing may be from the chamber liquid directly to the bellows, diaphragm or capsule means within the differential pressure sensing and transmitting means or the hydrostatic pressure from the liquid in the chamber may act on a column of air and pneumatically operate a pressure differential sensing device. Also, the pressure differential sensing means itself may provide an electronic signal or there may be a pneumatic signal which, in turn, is sent to a converter which will in turn provide an electrical signal. However, typically a preferred system will utilize hydraulic pressure directly to bellows or to each side of capsule means within a differential pressure indicating means and an electronic signal will be provided to carry to the signal divider means of the present system. In other words, there will be a force-balance differential pressure transmitter which can transmit an electrical signal. However, it is to be noted that the differential pressure measuring means may be of the deflection type which may also provide a suitable pneumatic or electrical signal for transmission to a signal divider means.

Also, typically, the signal dividing means will be of an electrical type, as for example a solid state analog computing instrument, which will be more specifically described in connection with the accompanying drawing. The signal divider means will, in turn, connect with suitable readout means which may be of a type providing the continuous recording of the divided signals on moving chart means or, optionally, there may be a suitable current indicating means providing a moving pointer in combination with a calibrated dial that is capable of indicating variations in the ratio between the outputs of the two spaced apart differential pressure transmitting means. In any event, by suitable calibration of a dial type of readout or by the location of a curve on a moving chart there can be a direct indication of a distance or measurement which will be determinative of the location of the liquid-liquid interface within the particular column or chamber.

Reference to the accompanying drawing and the following description thereof will serve to illustrate diagrammatically the various components of the present interface determining system as well as illustrate pressure points or levels and dimensioning embodiments within the system for determining a desired varying level between two different liquid phases.

FIG. 1 of the drawing illustrates in a diagrammatic elevational view the lower portion of a liquid column for separating two different liquids and the piping and instrumentation for providing one embodiment of the interface determining apparatus.

Figure 2:
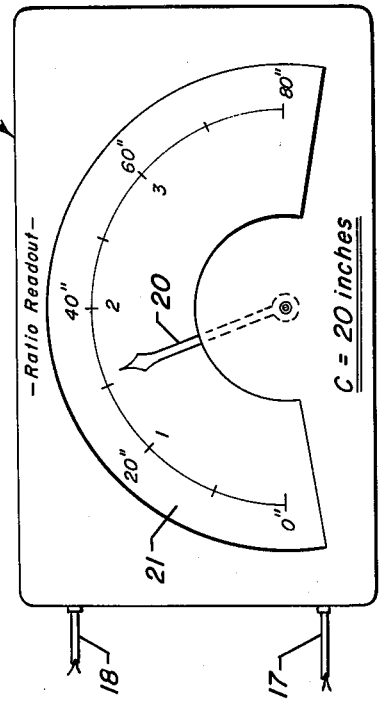

FIG. 2 of the drawing illustrates diagrammatically that the readout from the interface level determining system may be of the nature of a moving pointer over a calibrated dial, which is also suitable to provide a visual indication of a varying output from the signal divider means of the system.

Referring now particularly to FIG. 1 of the drawing, there is indicated the lower portion of a vessel 1 which is adapted to receive two different liquid phases that are substantially immiscible with one another such that there is a resulting varying level liquid-liquid interface indicated at level 2 within the interior of the chamber. The various inlets and outlet means to the chamber 1 are not illustrated; however, there will normally be suitable inlet means to provide for the introduction of a mixed phase liquid stream as well as means to withdraw the resulting upper lower density phase and the lower higher density phase. The latter, for example, could be withdrawn by way of outlet line 3 having valve 4.

In accordance with the present invention, one conduit means 5 connects with chamber 1 at an upper level or point indicated at $P_0$. Another conduit section 6 connects with the chamber at a level or point $P_1$ as well as to a differential pressure transmitter means $DP_1$. Also on the same horizontal level with conduit 6 there is provided conduit means 7 which extends between a vertical riser portion of conduit 5 and the pressure differential indicating means $DP_1$. Thus, the latter is positioned to read and transmit the differential pressure reading indicated between hydrostatic pressures at $P_1$ and at $P_2$ (the latter occurring at the level of conduit 7 and the juncture between lines 5 and 7).

In addition, there is provided conduit means 8 connecting at its upper end with chamber 1 and at a level or point $P'_0$, as well as a conduit means 9 which connects with a still lower portion of chamber 1 at a level or point $P_3$. Conduit 9 should also be maintained horizontally and will connect with a differential pressure transmitting means $DP_2$ in order to provide one pressure reading to the latter. Also connecting to the differential pressure transmitter $DP_2$ is conduit means 10 which extends laterally between the latter and the vertical riser portion of conduit 8 such that the differential pressure transmitting means will be positioned to provide a resulting signal to two differential pressures between points $P_3$ and $P_4$, the latter being the pressure provided at the level of horizontal conduit 10, and in turn resulting from the juncture of the latter with riser line 8. In accordance with the present invention, the heavy, higher density liquid phase from chamber 1 will be circulated through both the vertical lines 5 and 8 by means of the withdrawal conduit 11, pump means 12 and pump discharge line 13. Actually, flow control means 5' and 8' will be used in the respective lines 5 and 8 so as to provide a minimal fluid flow and give primarily only a static pressure head effect in the lines and to the higher pressure sides of the differential pressure devices at $DP_1$ and $DP_2$.

There is further indicated by FIG. 1 that electrical signal means from the differential pressure transmitter $DP_1$ will carry by way of leads 14 to a signal divider 15 while leads 16 will carry the signal from transmitter $DP_2$ to the signal divider 15. The latter, for example, may comprise a multiplier-divider of the Model 66D Series, as supplied by The Foxboro Co. Such a device would be a solid state analog computing instrument capable of dividing the signals from the two different differential pressure transmitting means $DP_1$ and $DP_2$. Also, the latter may be of the Foxboro type, such as Model E13 Series electronic $d/p$ cell transmitter means. The foregoing series of instruments are indicated in The Foxboro Company General Catalog No. 569. The E13 Series transmitters are of the force-balance type for transmitting differential pressure and embody twin diaphragm capsular measuring elements within each transmitting means; although, as hereinbefore noted, differential pressure receiving means and transmitting means may be of the pneumatic type as well as of a deflection type, rather than of the force-balance construction. However, where a pneumatic signal is sent from the transmitter there will necessarily be a converter means in the system to receive the signals from the transmitter means and then provide electronic signals to the signal divider means 15.

Again referring to FIG. 1, the resulting signal from the divider means 15 will be such as to provide a quotient or ratio obtained from the dividing of the output signal from $DP_2$ by the output signal of $DP_1$, and such divided signal is carried by way of lines 17 and 18 to the ratio receiver-recorder means 19. In this instance, there is indicated an electronic receiver-recorder which may incorporate moving chart means (such as Model 64H in the heretofore noted Foxboro General Catalog No. 569). However, various types of signal receiver means may be utilized at 19 and the present improved system need not be limited to any one type of signal receiver. Specifically, inasmuch as the receiver 19 obtains an output from signal divider 15 that is in turn a ratio or quotient of two other output signals, then the reading is a numerical value greater than 0. This numerical value is applied to the constant distance or measurement which exists along the column 1 between $P_0$ and $P_1$ to in turn provide a numerical value that is determinative of the liquid-liquid interface level in the column 1. Specifically, where the measurement C is a constant (as determined by the distance between $P_0$ and $P_1$ in FIG. 1), then the distance A which is variable, and exists as a measurement below the level of $P'_0$ to the interface, will be obtained by multiplying C times the ratio obtained at the receiver instrument 19. By way of example, if the system were installed such that measurement C is equal to 20 inches, then where $A = C \times$ output $DP_2$/output $DP_1$, then with a resulting ratio of 1.50, A would equal 30 inches.

In order to illustrate that the ratio (or quotient) from dividing the output signal from the lower differential pressure transmitter by the output from the upper differential pressure transmitter when multiplied times the distance between the uppermost pressure sensing levels will provide a reading determinative of the location of the liquid-liquid interface, the following equations and calculations are hereinafter set forth, (with the various distances, pressures and symbols being in accordance with those indicated in FIG. 1 of the drawing):

The output signal of $DP_1 = P_2 - P_1$ with $P_1 = P_0 + Cd_{hc}$ and $P_2 = P_0 + Cd_s$ $\quad \begin{Bmatrix} d_{hc} = \text{density of hydrocarbon phase} \\ d_s = \text{density of solvent phase} \end{Bmatrix}$ then $DP_1 = C(d_s - d_{hc})$ Also the output signal of $DP_2 = P_4 - P_3$
with
$P_3 = P'_0 + Ad_{hc} + (B-A)d_s$
and
$P_4 = P'_0 + Bd_s$
such that:
$DP_2 = A(d_s - d_{hc})$ Thus, the ratio: (output signal $DP_2$/output signal $DP_1$) = $[A(d_s-d_{hc})/C(d_s-d_{hc})]$ and distance $A = C(DP_2/DP_1)$, such that with $C$ being a fixed distance, then $A$ will be a variable determinable measurement downwardly from the $P'_0$ level.

In another example, in the event that distance C were still equal to 20 inches and the resulting ratio at readout means 19 was 3.0, then the liquid-liquid interface 2 in column 1 from the determination of distance A would be 3 × 20 inches or some 60 inches below the level of $P'_0$.

In FIG. 2 of the drawing, there is merely indicated an optional form of readout means 19' which would provide the ratio or quotient signal from signal divider means by way of lines 17 and 18, where the specific readout is indicated by a movable needle or pointer means 20 over a calibrated dial 21. The particular dial can be calibrated to show the actual numerical readout as well as be calibrated to show a scale which is the multiplication of the fixed measurement C and a varying ratio to be noted by the pointer 20. The indicator means 19' would, for example, be similar to a Model 64H of The Foxboro Co. type Catalog No. 569, heretofore noted. Also, in FIG. 2, for illustrative purposes, indicates that C is equal to 20 inches; however, where other distances are used in an actual installation for providing pressure taps to the column 1 at levels or points $P_0$ and $P_1$, then suitable calibration must be made on the dial to provide feet or inches, or whatever, to suit the actual measurement for C.

The entire system is of particular advantage, as heretofore noted, for eliminating problems of varying density for either of the liquid phases on either side of a liquid-liquid interface in the column inasmuch as the varying density aspects are, in effect, canceled out by the pressures provided from the riser lines 5 and 8 in the installed system. Of course, in the present system there may be minor corrections in the calibration to take care of frictional losses in the lines inasmuch as the hereinbefore set forth calculations ignore any pressure drops or pressure losses that can occur through the conduits in reaching each of the differential pressure receiving and transmitting devices.

While the present system is particularly adaptable for use in the petroleum industry, such as for example in solvent extraction operations, where a particular solvent may be selectively absorbing and removing a desired fraction or fractions from a mixed phase stream, it is to be noted that the system might well be utilized in connection with any storage chamber or processing chamber where there is a varying level for the liquid-liquid interface between two substantially immiscible liquid phases.

I claim as my invention:

1. An apparatus system for locating an interface between liquids of different density that are collected within a confined chamber, with such system comprising in combination,
   a. a first and second spaced apart levels of conduit connections to an upper portion of said chamber to provide pressure sensing contact with the lower density liquid at said two spaced levels;
   b. means connecting each of said levels for pressure sensing to a first differential pressure transmitting device;
   c. a third level of conduit connection and of pressure sensing to said chamber at a position below said first spaced apart connections to said chamber to also be in contact with said lower density liquids;
   d. a fourth level of conduit connection means and of pressure sensing connective to a lower level in said chamber for contact with the higher density liquid being collected therein;
   e. means connecting said third and fourth connection levels for pressure sensing to a second differential pressure transmitting device;
   f. liquid outlet means from a lower portion of said chamber connective to pump means and to additional conduit means which is connective to said conduit connections at said first and said third sensing levels, and to the higher pressure level side for each of said differential pressure transmitting devices to thereby add hydrostatic pressure from the higher density liquid to each such side;
   g. signal divider means connective to said two devices to divide the differential pressure signals from said devices; and
   h. a signal divider readout means to provide a ratio output reading which can be calibrated to indicate an interface position below said third level of pressure sensing.

2. The apparatus system of claim 1 further characterized in that each of said differential pressure transmitting devices provide electrical signals to said signal divider means and the latter is an analog computer which provides a numerical readout ratio at said signal divider readout means.

3. The apparatus system of claim 1 further characterized in that said signal divider readout means is an electrical receiver-recorder type providing a marked chart visually indicating a varying ratio of output signals between said second differential pressure transmitting device and said first differential pressure transmitting device.

4. The apparatus system of claim 1 further characterized in that the signal divider readout means is calibrated to indicate the ratio output reading, resulting from dividing the output signal of said second differential pressure transmitting device by the output signal from said first differential pressure transmitter device and, additionally show the multiplication of such ratio reading with a constant equal to the distance between the two uppermost spaced apart pressure sensing levels connective with said chamber.

5. The apparatus system of claim 1 further characterized in that said signal divider readout means is an electrical indicator providing movable pointer means in combination with a calibrated scale that will, in turn, indicate visually the ratio output reading.

6. The apparatus system of claim 5 still further characterized in that said calibrated scale for the indicator shows a direct reading for a positioning of the liquid-liquid interface based on the multiplication of the resulting ratio readout and a constant equal to the fixed distance between the first and second spaced apart levels of conduit connections for pressure sensing.

7. The apparatus system of claim 1 further characterized in that the means to fill said conduit means from the lower portion of said chamber to elevated levels thereof will comprise pumping means in such conduit which will also have flow control means in the lower portions thereof to provide minimal higher density liquid flow therein so as to provide primarily only static pressure head effect to the higher pressure sides of said differential pressure devices.

* * * * *